United States Patent
Ohta et al.

(10) Patent No.: US 10,863,482 B2
(45) Date of Patent: Dec. 8, 2020

(54) WIRELESS COMMUNICATION APPARATUS, WIRELESS COMMUNICATION SYSTEM, AND PROCESSING METHOD

(71) Applicant: FUJITSU LIMITED, Kawasaki (JP)

(72) Inventors: Yoshiaki Ohta, Yokohama (JP); Shinichiro Aikawa, Yokohama (JP); Takayoshi Ode, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/025,459

(22) Filed: Jul. 2, 2018

(65) Prior Publication Data
US 2018/0310295 A1 Oct. 25, 2018

Related U.S. Application Data

(63) Continuation of application No. PCT/JP2016/050804, filed on Jan. 13, 2016.

(51) Int. Cl.
*H04W 72/04* (2009.01)
*H04W 8/00* (2009.01)
*H04W 72/08* (2009.01)
*H04W 48/12* (2009.01)

(52) U.S. Cl.
CPC ....... *H04W 72/0406* (2013.01); *H04W 8/005* (2013.01); *H04W 72/087* (2013.01); *H04W 48/12* (2013.01)

(58) Field of Classification Search
CPC ............. H04W 72/0406; H04W 8/005; H04W 72/087
See application file for complete search history.

(56) References Cited

U.S. PATENT DOCUMENTS

| 2013/0194943 A1 | 8/2013 | Davydov et al. |
| 2015/0163729 A1 | 6/2015 | Seo et al. |
| 2016/0174142 A1 | 6/2016 | Kitagawa et al. |
| 2016/0255615 A1* | 9/2016 | Chatterjee ............. H04W 72/04 |

(Continued)

FOREIGN PATENT DOCUMENTS

| JP | 11-017607 A | 1/1999 |
| JP | 2015-35695 A | 2/2015 |
| JP | 2015-510333 A | 4/2015 |

(Continued)

OTHER PUBLICATIONS

International Search Report with Written Opinion of the International Searching Authority issued by the Japan Patent Office for corresponding International Patent Application No. PCT/JP2016/050804, dated Apr. 5, 2016, with a partial English translation.

(Continued)

*Primary Examiner* — Ronald B Abelson
(74) *Attorney, Agent, or Firm* — Myers Wolin, LLC.

(57) ABSTRACT

A wireless communication apparatus, for performing wireless communication with a first wireless communication apparatus based on a discovery signal, includes: a control circuit configured to control a probability of using a radio resource for the discovery signal; and a communication circuit configured to transmit the discovery signal to the first wireless communication apparatus through the radio resource in accordance with the probability.

18 Claims, 14 Drawing Sheets

(56) References Cited

U.S. PATENT DOCUMENTS

2016/0294595 A1    10/2016    Harada et al.
2016/0381562 A1*   12/2016    Zhang .................. H04W 16/10

FOREIGN PATENT DOCUMENTS

| | | |
|---|---|---|
| JP | 2015-88952 A | 5/2015 |
| JP | 2015-529030 A | 10/2015 |
| WO | 2015/020173 A1 | 2/2015 |

OTHER PUBLICATIONS

3GPP TS 36.300 V12.5.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", Mar. 2015.

3GPP TS 36.211 V12.5.0, "3rd Generation Partnership Project; Technical Specification Group Radio Access Network; Evolved Universal Terrestrial Radio Access (E-UTRA); Physical channels and modulation (Release 12)", Mar. 2015.

3GPP TS 36.212 V12.4.0, "3rd Generation Partnership Project; Technical Specification Group Radio Access Network; Evolved Universal Terrestrial Radio Access (E-UTRA); Multiplexing and channel coding (Release 12)", Mar. 2015.

3GPP TS 36.213 V12.5.0, "3rd Generation Partnership Project; Technical Specification Group Radio Access Network; Evolved Universal Terrestrial Radio Access (E-UTRA); Physical layer procedures (Release 12)", Mar. 2015.

3GPP TS 36.321 V12.5.0, "3rd Generation Partnership Project; Technical Specification Group Radio Access Network; Evolved Universal Terrestrial Radio Access (E-UTRA); Medium Access Control (MAC) protocol specification (Release 12)", Mar. 2015.

3GPP TS 36.322 V12.2.0, "3rd Generation Partnership Project; Technical Specification Group Radio Access Network; Evolved Universal Terrestrial Radio Access (E-UTRA); Radio Link Control (RLC) protocol specification (Release 12)", Mar. 2015.

3GPP TS 36.323 V12.3.0, "3rd Generation Partnership Project; Technical Specification Group Radio Access Network; Evolved Universal Terrestrial Radio Access (E-UTRA); Packet Data Convergence Protocol (PDCP) specification (Release 12)", Mar. 2015.

3GPP TS 36.331 V12.5.0, "3rd Generation Partnership Project; Technical Specification Group Radio Access Network; Evolved Universal Terrestrial Radio Access (E-UTRA); Radio Resource Control (RRC); Protocol specification (Release 12)", Mar. 2015.

3GPP TS 36.413 V125.0, "3rd Generation Partnership Project; Technical Specification Group Radio Access Network; Evolved Universal Terrestrial Radio Access Network (E-UTRAN); S1 Application Protocol (S1AP) (Release 12)", Mar. 2015.

3GPP TS 36.423 V12.5.0, "3rd Generation Partnership Project; Technical Specification Group Radio Access Network; Evolved Universal Terrestrial Radio Access Network (E-UTRAN); X2 application protocol (X2AP) (Release 12)", Mar. 2015.

3GPP TR 36.842 V12.0.0, "3rd Generation Partnership Project; Technical Specification Group Radio Access Network; Study on Small Cell enhancements for E-UTRA and E-UTRAN; Higher layer aspects (Release 12)", Dec. 2013.

3GPP TR 36.843 V12.0.1, "3rd Generation Partnership Project; Technical Specification Group Radio Access Network; Study on LTE Device to Device Proximity Services; Radio Aspects (Release 12)", Mar. 2014, pp. 1, 16-21.

Intel Corporation, "On remaining details of D2 discovery", Agenda Item: 6.2.1.8, 3GPP TSG-RAN WG1 Meeting #79, R1-144654, San Francisco, USA, Nov. 17-21, 2014.

CATT, "Detailed Signaling Flows for D2D Discovery", Agenda Item: 7.4.3.1, 3GPP TSG-RAN WG2 Meeting #86, R2-142103, Seoul, Korea, May 19-23, 2014.

Itri, "On Discovery Resource Management", Agenda Item: 7.4.3, 3GPP TSG-RAN WG2 Meeting #87, R2-143463, Dresden, Germany, Aug. 18-22, 2014.

Japanese Office Action issued for corresponding Japanese Patent Application No. 2017-561102, dated May 21, 2019, with Partial-Machine, English translation.

Nokia et al.,"Resource allocation for discovery signals," Agenda item: 7.2.8.2.2, 3GPP TSG-RAN WGI Meeting #76, R1-140575, Feb. 10-14, 2014, Prague, Czech Republic (cited in JP-OA dated May 21, 2019 for corresponding Japanese Patent Application No. 2017-561102).

Sony, "Procedure and open issues for Discovery Type 1 and 2b", Agenda item: 7.4.3, 3GPP TSG-RAN WG2 Meeting #85bis, R2-141299, Mar. 30-Apr. 4, 2014, Valencia, Spain. (cited in JP-OA dated May 21, 2019 for corresponding Japanese Patent Application No. 2017-561102).

* cited by examiner

WIRELESS COMMUNICATION APPARATUS, WIRELESS COMMUNICATION SYSTEM, AND PROCESSING METHOD

CROSS-REFERENCE TO RELATED APPLICATION

This application is a continuation application of International Application No. PCT/JP2016/050804 filed on Jan. 13, 2016 and designated the U.S., the entire contents of which are incorporated herein by reference.

FIELD

The embodiments discussed here are related to a wireless communication apparatus, a wireless communication system, and a processing method.

BACKGROUND

Nowadays, the 3rd Generation Partnership Project (3GPP) which is a standardization body has completed or examined specifications of a Long Term Evolution (LTE) system or an LTE-Advanced (LTE-A) system based on the LTE system. 3GPP Release 8 to Release 12 are formulated as international specifications.

In 3GPP Release 12, Device to Device Proximity Service (ProSe) (service based on terminal proximity; hereinafter referred to as "D2D communication" in some cases) is specified. The D2D communication is, for example, a wireless communication method in which wireless communication is performed between terminals without using a core network. Through the D2D communication, for example, it is possible to reduce a load on the core network or to increase the capacity of a default bandwidth.

The D2D communication supports two functions such as a discovery function and a direct communication function. The discovery function is, for example, a function of finding a proximity terminal based on transmission and reception of a discovery signal. The direct communication function is, for example, a function of terminals directly performing communication with each other. The discovery function is expected to be mainly used for a commercial service, and the direct communication function is expected to be mainly used for public safety such as police or fire wireless communication. The discovery function in a commercial service may be supposed to be used within a network coverage.

3GPP Release 12 defines the following two methods as methods of transmitting a discovery signal. The first method is a method in which a base station explicitly allocates a radio resource for transmitting a discovery signal to a terminal, and the terminal transmits a discovery signal by using the radio resource. The second method is a method in which a base station allocates a resource pool to a terminal, and the terminal transmits a discovery signal by using a radio resource selected from the resource pool.

In a case of the method of using a resource pool, for example, the terminal acquires a random number p1, and can use the resource pool in a case where the acquired random number is smaller than a threshold value (Tx:tx-probability). FIG. 14 illustrates a relationship example between the random number p1 and the probability P. In FIG. 14, a transverse axis expresses the random number p1, and a longitudinal axis expresses the probability P. As illustrated in FIG. 14, a probability of being capable of using the resource pool at values of the random number p1 from "0" to "Tx" is 1/Tx, and the probability 1/Tx is uniform from "0" to "Tx".

Examples of the related art include Non-Patent Literature 1 [3GPP TS36.300 V12.5.0 (2015-03)], Non-Patent Literature 2 [3GPP TS36.211 V12.5.0 (March 2015)], Non-Patent Literature 3 [3GPP TS36.212 V12.4.0 (March 2015)], Non-Patent Literature 4 [3GPP TS36.213 V12.5.0 (March 2015)], Non-Patent Literature 5 [3GPP TS36.321 V12.5.0 (March 2015)], Non-Patent Literature 6 [3GPP TS36.322 V12.2.0 (March 2015)], Non-Patent Literature 7 [3GPP TS36.323 V12.3.0 (March 2015)], Non-Patent Literature 8 [3GPP TS36.331 V12.5.0 (March 2015)], Non-Patent Literature 9 [3GPP TS36.413 V12.5.0 (March 2015)], Non-Patent Literature 10 [3GPP TS36.423 V12.5.0 (March 2015)], Non-Patent Literature 11 [3GPP TR36.842 V12.0.0 (December 2013)], and Non-Patent Literature 12 [3GPP TR36.843 V12.0.1 (March 2014)].

SUMMARY

According to an aspect of the invention, a wireless communication apparatus, for performing wireless communication with a first wireless communication apparatus based on a discovery signal, includes: a control circuit configured to control a probability of using a radio resource for the discovery signal; and a communication circuit configured to transmit the discovery signal to the first wireless communication apparatus through the radio resource in accordance with the probability.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
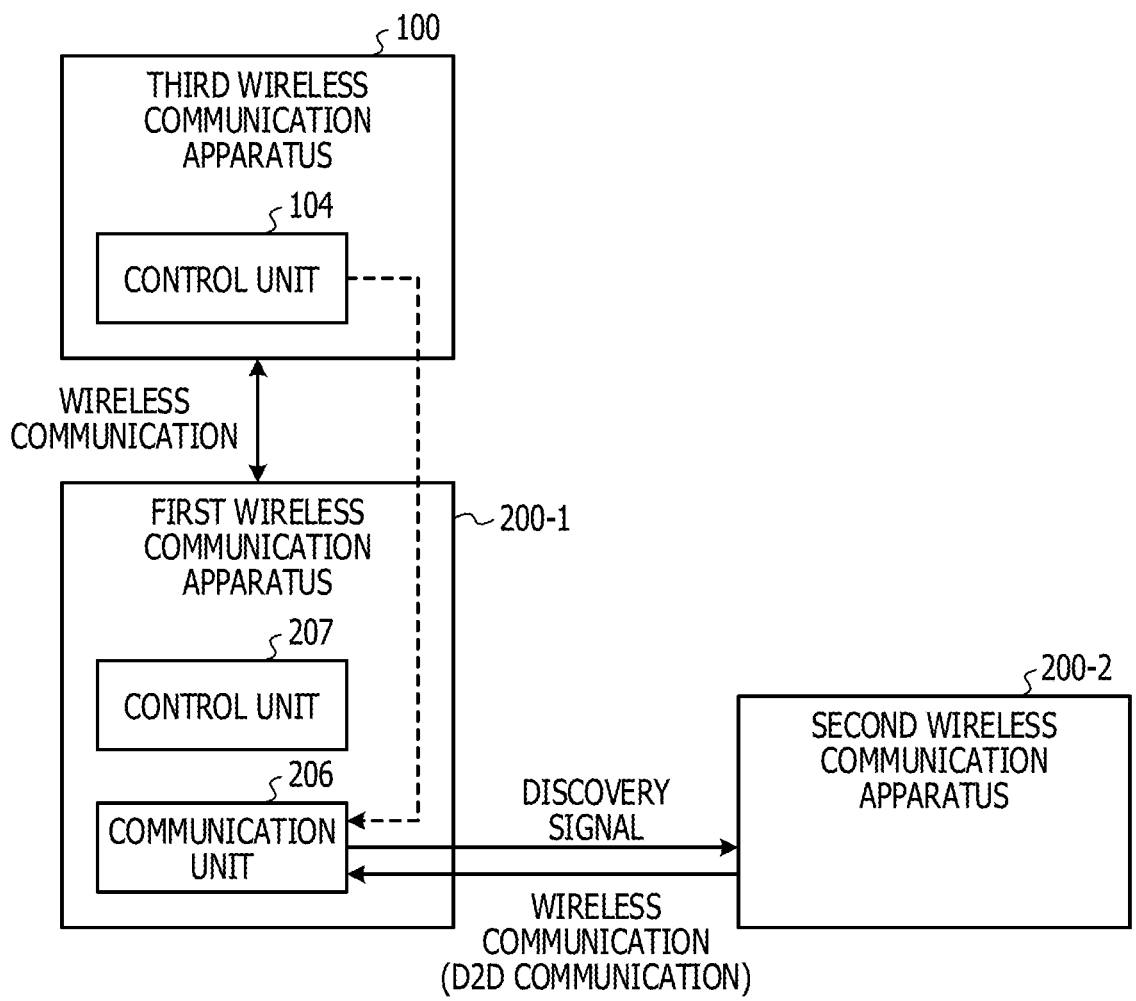
FIG. 1 illustrates a configuration example of a wireless communication system.

However, in the method of using a resource pool, in a case where the acquired random number p1 exceeds the threshold value Tx even if a quality of service (QoS) level is more than a predetermined value, the terminal may not use the resource pool. In a case where the acquired random number p1 smaller the threshold value Tx even if the QoS level is equal to or less than the predetermined value, the terminal may use the resource pool. In this case, since the QoS level is less than the predetermined value, even if a discovery signal is transmitted, the terminal may not find other terminals, and thus may not performed D2D communication.

According to the present disclosure, provided are technologies for improving service quality in a wireless communication apparatus, a wireless communication system, and a processing method.

Hereinafter, the present embodiment will be described in detail with reference to the drawings. The object and the embodiment in the present application are only examples, and do not limit the scope of rights of the present application. Particularly, even if there is a difference between disclosed expressions, the technique of the present application can be applied to even a differing expression as long as the expression provides a technical equivalent, and the scope of rights is not limited.

Terms used in the present specification or technical contents disclosed in the present specification may appropriately employ terms or technical contents disclosed in specifications as standards regarding communication in the 3GPP or the like. Examples of the specifications include the above Non-Patent Literatures 1 to 12.

The above Non-Patent Literatures 1 to 12 may be used in terms of the date, but are updated at any time, and thus terms or technical contents disclosed in the above Non-Patent Literatures 1 to 12 issued right before the filing date of the present application may be appropriately used in the specification of the present application.

A summary disclosed in each document from Non-Patent Literature 1 to Non-Patent Literature 12 is as follows.

In other words, Non-Patent Literature 1 (3GPP TS36.300 V12.5.0 (March 2015)) discloses, for example, a summary specification of LTE-Advanced.

Non-Patent Literature 2 (3GPP TS36.211 V12.5.0 (March 2015)) discloses, for example, a physical layer (PHY) channel (or a physical channel) specification of LTE-A.

Non-Patent Literature 3 (3GPP TS36.212 V12.4.0 (March 2015)) discloses, for example, a PHY encoding specification of LTE-A.

Non-Patent Literature 4 (3GPP TS36.213 V12.5.0 (March 2015)) discloses, for example, a PHY procedure specification of LTE-A.

Non-Patent Literature 5 (3GPP TS36.321 V12.5.0 (March 2015)) discloses, for example, a Medium Access Control (MAC) specification of LTE-A.

Non-Patent Literature 6 (3GPP TS36.322 V12.2.0 (March 2015)) discloses, for example, a Radio Link Control (RLC) specification of LTE-A.

Non-Patent Literature 7 (3GPP TS36.323 V12.3.0 (March 2015)) discloses, for example, a Packet Data Convergence Protocol (PDCP) specification of LTE-A.

Non-Patent Literature 8 (3GPP TS36.331 V12.5.0 (March 2015)) discloses, for example, a Radio Resource Control (RRC) specification of LTE-A.

Non-Patent Literature 9 (3GPP TS36.413 V12.5.0 (March 2015)) discloses, for example, an S1 specification of LTE-A.

Non-Patent Literature 10 (3GPP TS36.423 V12.5.0 (March 2015)) discloses, for example, an X2 specification of LTE-A.

Non-Patent Literature 11 (3GPP TR36.842 V12.0.0 (December 2013)) is, for example, an examination note for a small cell technique of LTE-A.

Non-Patent Literature 12 (3GPP TR36.843 V12.0.1 (March 2014)) is, for example, an examination note for a D2D communication technique.

First Embodiment

A first embodiment will be described. FIG. 1 is a diagram illustrating a configuration example of a wireless communication system 10 in the first embodiment. The wireless communication system 10 includes first to third wireless communication apparatuses 200-1, 200-2, and 100.

The first wireless communication apparatus 200-1 and the second wireless communication apparatus 200-2 perform wireless communication based on a discovery signal. For example, the first and second wireless communication apparatuses 200-1 and 200-2 perform D2D communication. The first wireless communication apparatus 200-1 performs wireless communication with the third wireless communication apparatus 100.

The first and third wireless communication apparatuses 200-1 or 100 respectively include control units 207 and 104. The control units 207 and 104 control a probability of using a radio resource for a discovery signal. In a case where the control unit 207 controls a probability of using a radio resource for a discovery signal, information regarding the controlled probability may be output to a communication unit 206. In a case where the control unit 104 controls a probability of using a radio resource for a discovery signal, information regarding the controlled probability may be output to the communication unit 206.

The first wireless communication apparatus 200-1 includes the communication unit 206. The communication unit 206 uses a radio resource according to a radio resource usage probability controlled by the control unit 207 or 104, and transmits a discovery signal to the second wireless communication apparatus 200-2.

As mentioned above, in the first embodiment, the first or third wireless communication apparatus 200-1 or 100 controls a probability of using a discovery signal. Consequently, for example, it is possible to avoid a situation in which the first wireless communication apparatus 200-1 may not transmit a discovery signal in a case where a QoS level of the discovery signal is high. For example, it is possible to avoid a situation in which the first wireless communication apparatus 200-1 repeatedly transmits a discovery signal many times in a case where a QoS level of the discovery signal is low. Therefore, in the wireless communication system 10, it is possible to improve service quality for a discovery signal, and further service quality for D2D communication.

Second Embodiment

Next, a second embodiment will be described.

Configuration Example of Wireless Communication System

Figure 2:
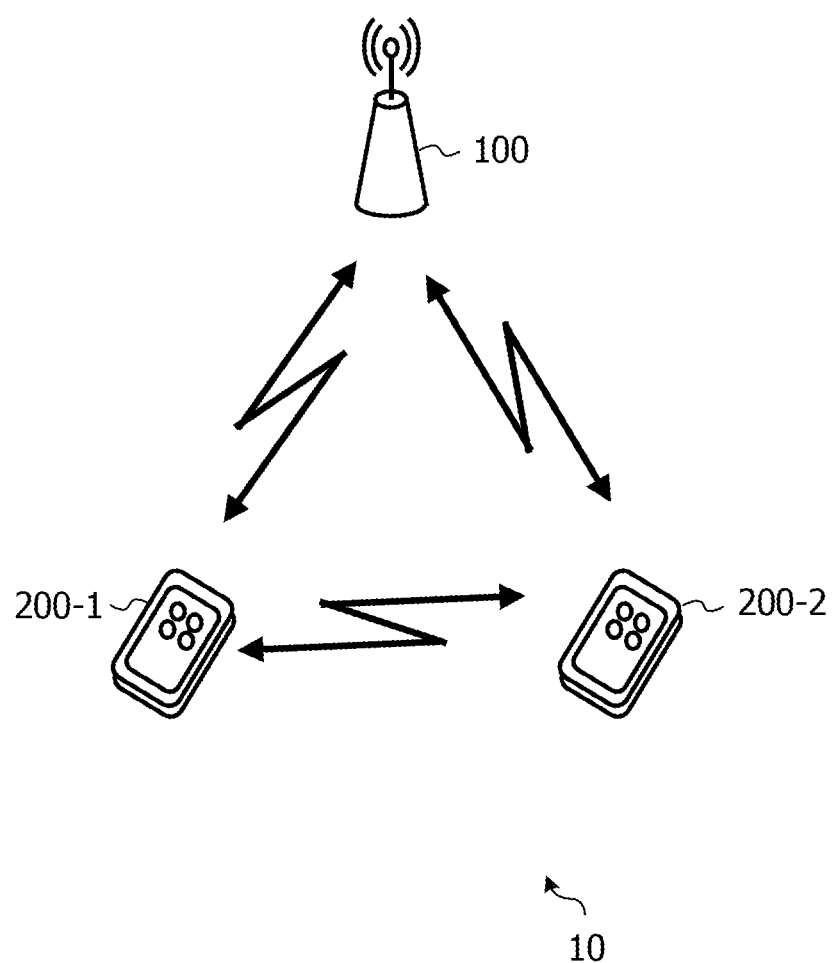
FIG. 2 illustrates a configuration example of the wireless communication system.

FIG. 2 illustrates a configuration example of a wireless communication system 10. The wireless communication system 10 includes a base station apparatus (hereinafter, referred to as a "base station" in some cases) 100, and mobile station apparatuses (hereinafter, referred to as "mobile stations" in some cases) 200-1 and 200-2.

The base station 100 is, for example, a wireless communication apparatus which performs wireless communication with the mobile stations 200-1 and 200-2 located in a service area of the base station.

Each of the mobile stations 200-1 and 200-2 is, for example, a wireless communication apparatus such as a smart phone, a feature phone, a tablet terminal, a personal computer, or a game apparatus. The mobile stations 200-1 and 200-2 may perform wireless communication with the base station 100 so as to be provided with various services such as a call service or a web page viewing service.

The mobile stations 200-1 and 200-2 may perform D2D communication. The D2D communication is a communication method specified as Device to Device Proximity Service (ProSe) (service based on terminal proximity) in 3GPP Release 12.

In the second embodiment, the mobile stations 200-1 and 200-2 performs D2D communication using the discovery function. In the D2D communication using the discovery function, for example, the mobile station 200-1 transmits and receives a discovery signal (or an inter-terminal finding signal) so as to find another mobile station 200-2, and the D2D communication is performed between the mobile stations 200-1 and 200-2. For example, the discovery signal is a signal used to find the peripheral mobile station 200-2 in order for the mobile station 200-1 to perform the D2D communication.

The mobile stations 200-1 and 200-2 receive parameter information such as a synchronization signal or a radio resource from the base station 100. The mobile stations 200-1 and 200-2 perform the D2D communication based on the received parameter information. The parameter information also includes a radio resource for a discovery signal. The radio resource for a discovery signal has several candidates in a resource pool, and, for example, the mobile station 200-1 transmits a discovery signal by using a radio resource in the resource pool. The mobile stations 200-1 and 200-2 may transmit a discovery signal by using the Physical Sidelink Discovery Channel (PSDCH).

The base station 100 may perform a notification of (or may perform broadcast transmission of) parameter information regarding the D2D communication by using the System Information Block (SIB) 18 or the SIB19. The SIB18 includes D2D communication parameter information using the direct communication function, and the SIB19 includes D2D communication parameter information using the discovery function.

The base station 100 and the mobile stations 200-1 and 200-2 can perform bidirectional wireless communication. In other words, communication in a direction (hereinafter, referred to as a "downlink (DL) direction" in some cases) from the base station 100 toward the mobile stations 200-1 and 200-2 and communication in a direction (hereinafter, referred to as an "uplink (UL) direction" in some cases) from the mobile stations 200-1 and 200-2 toward the base station 100 can be performed.

In this case, the base station 100 performs scheduling with respect to wireless communication in a downlink direction and an uplink direction with the mobile stations 200-1 and 200-2, so as to allocate a radio resource or to determine an encoding method or a modulation method. The base station 100 transmits a control signal including scheduling information indicating a scheduling result to the mobile stations 200-1 and 200-2. The base station 100 and the mobile stations 200-1 and 200-2 perform wireless communication according to the scheduling information included in the control signal.

The mobile stations 200-1 and 200-2 may perform the D2D communication by using, for example, a radio resource allocated from the base station 100 when the mobile stations 200-1 and 200-2 perform wireless communication in an uplink direction.

In the wireless communication system 10 illustrated in FIG. 2, an example in which two mobile stations 200-1 and 200-2 are under the control of the base station 100 is illustrated, but the number of mobile stations may be three or more, and the respective mobile stations may perform the D2D communication with each other.

In the wireless communication system 10 illustrated in FIG. 2, an example is illustrated in which the two mobile stations 200-1 and 200-2 performing the D2D communication are located within a cell range (or a service providing range) of the base station 100. For example, one of the two mobile stations 200-1 and 200-2 performing the D2D communication may be located within the cell range of the base station 100, and the other may be located out of the cell range. Alternatively, the mobile stations 200-1 and 200-2 may be moved from the cell range of the base station 100 to the outside of the cell range, and may perform the D2D communication. A configuration example of the wireless communication system 10 may appropriately employ, for example, scenarios written in specifications regarding the D2D communication, including the above non-patent literatures.

The mobile stations 200-1 and 200-2 have the same configuration, and thus will be described as a mobile station 200 unless otherwise mentioned.

Configuration Example of Base Station Apparatus

Figure 3:
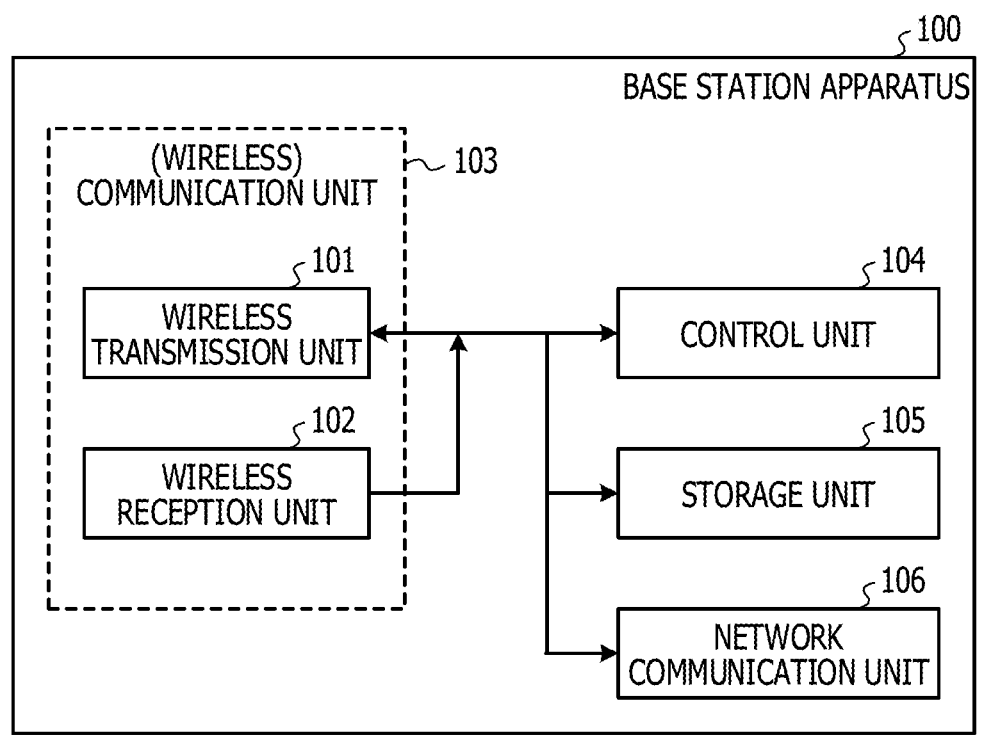
FIG. 3 illustrates a configuration example of a base station apparatus.

Next, a description will be made of a configuration example of the base station 100. FIG. 3 is a diagram illustrating a configuration example of the base station 100. The base station 100 includes a wireless transmission unit 101, a wireless reception unit 102, the control unit 104, a storage unit 105, and a network communication unit 106. The wireless transmission unit 101 and the wireless reception unit 102 may be included in a wireless communication unit (or communication unit) 103.

The wireless transmission unit 101 performs, for example, an error correction coding (ECC) process (hereinafter, referred to as an "encoding process" in some cases), a modulation process, and a frequency conversion process on data read from the storage unit 105 or a control signal output from the control unit 104, so as to convert the data or the control signal into a radio signal. The wireless transmission unit 101 transmits the radio signal after conversion to the mobile station 200.

The wireless reception unit 102 receives, for example, a radio signal transmitted from the mobile station 200. The wireless reception unit 102 performs a frequency conversion process, a demodulation process, or an error correction decoding process (hereinafter, referred to as a "decoding process" in some cases) on the received radio signal, so as to extract data or a control signal. The wireless reception unit 102 outputs the extracted data or control signal to the storage unit 105 or the control unit 104.

The control unit 104 performs the scheduling, and outputs a result thereof to the wireless transmission unit 101 or the wireless reception unit 102 as scheduling information. The control unit 104 generates a control signal including the scheduling information, and outputs the control signal to the wireless transmission unit 101. The control signal is transmitted to the mobile station 200. The wireless transmission unit 101 or the wireless reception unit 102 transmits or visitor a radio signal according to the scheduling information.

The control unit 104 generates parameter information including information regarding a resource pool for a discovery signal transmitted and received between the mobile stations 200-1 and 200-2, information regarding a synchronization signal, and the like. The parameter information is used for the mobile stations 200-1 and 200-2 to perform the D2D communication. The control unit 104 outputs the generated parameter information to the wireless transmission unit 101. In this case, the control unit 104 may instruct the wireless transmission unit 101 to transmit the parameter information as notification information.

The control unit 104 controls a probability that the mobile stations 200-1 and 200-2 may use a radio resource for a discovery signal. Specifically, the control unit 104 controls allocation of a radio resource for a discovery signal according to a QoS level. Details thereof will be described later.

The storage unit 105 stores, for example, information regarding data or a control signal, and information regarding a resource pool. For example, the wireless reception unit 102, the control unit 104, or the network communication unit 106 stores data or a control signal in the storage unit 105 as appropriate. For example, the wireless transmission unit 101, the control unit 104, or the network communication unit 106 may read information regarding the data or the control signal stored in the storage unit 105 as appropriate, and may generate scheduling information or parameter information.

The network communication unit 106 is connected to another apparatus, and transmits and transmits data or the like to and from another apparatus. In this case, the network communication unit 106 converts data into packet data with a format which can be output to another apparatus, or extracts data or the like from packet data received from another data so as to output the data or the like to the storage unit 105 or the control unit 104. An example of another apparatus may be another base station, the Mobility Management Entity (MME), or the Serving Gateway (SGW).

Configuration Example of Mobile Station Apparatus

Figure 4:
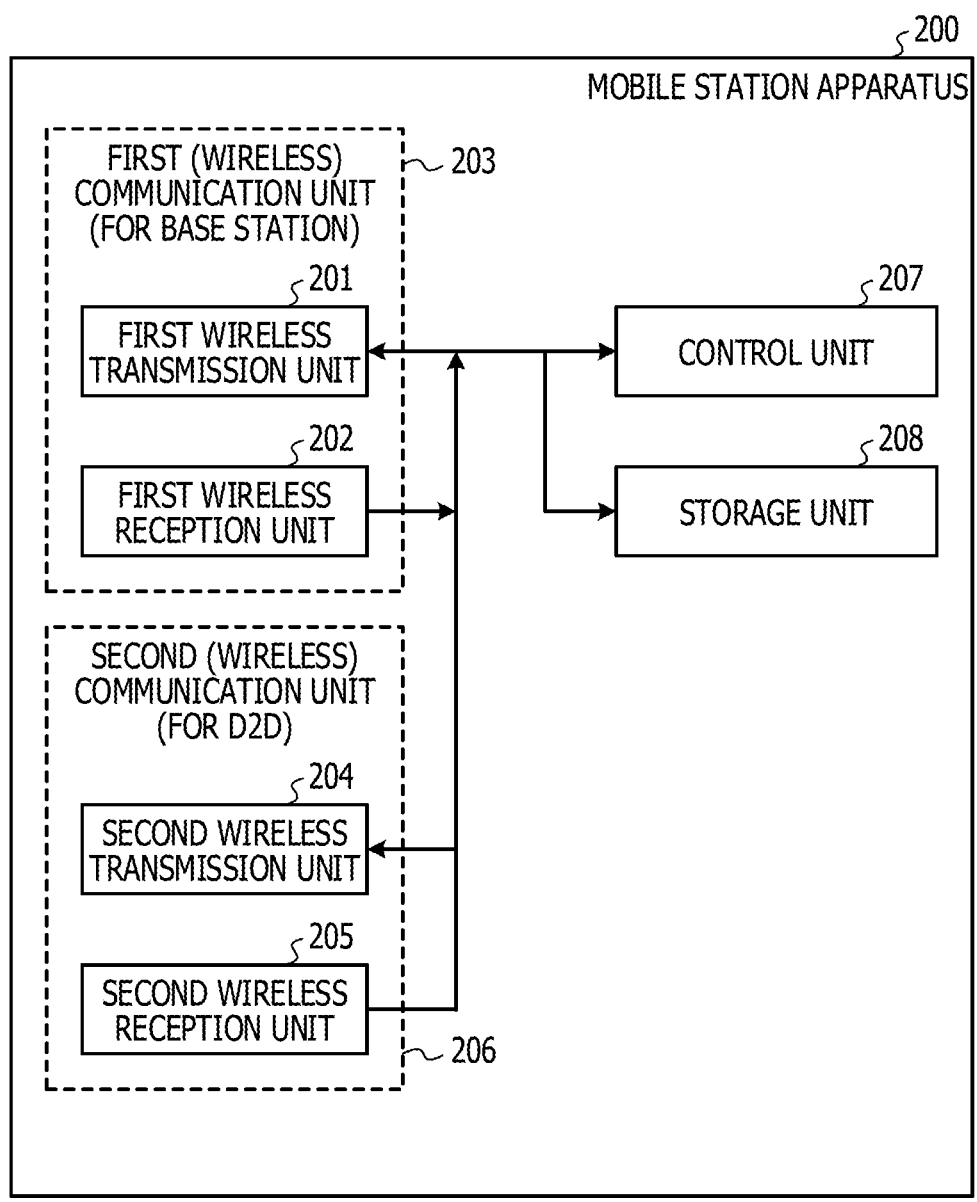
FIG. 4 illustrates a configuration example of a mobile station apparatus.

FIG. 4 is a diagram illustrating a configuration example of the mobile station 200. The mobile station 200 includes a first wireless transmission unit 201, a first wireless reception unit 202, a second wireless transmission unit 204, a second wireless reception unit 205, the control unit 207, and a storage unit 208. The first wireless transmission unit 201 and the first wireless reception unit 202 may be included in a first wireless communication unit (or a first communication unit) 203. The second wireless transmission unit 204 and the second wireless reception unit 205 may be included in a second wireless communication unit (or a second communication unit) 206. The first wireless communication unit 203 is used for wireless communication with the base station 100, and the second wireless communication unit 206 is used for D2D communication with other mobile stations.

The first wireless transmission unit 201 performs, for example, an encoding process, a modulation process, and a frequency conversion process on data read from the storage unit 208 or a control signal output from the control unit 207, so as to convert the data or the control signal into a radio signal. The first wireless transmission unit 201 transmits the radio signal to the base station 100.

The first wireless reception unit 202 receives the radio signal transmitted from the base station 100. The first wireless reception unit 202 performs a frequency conversion process, a demodulation process, or a decoding process on the received radio signal, so as to extract data, a control signal, or parameter information used for the D2D communication from the radio signal. The first wireless reception unit 202 outputs the extracted data, control signal, or parameter information to the control unit 207 or the storage unit 208.

The second wireless transmission unit 204 performs, for example, an encoding process, a modulation process, and a frequency conversion process on a discovery signal output from the control unit 207 or data read from the storage unit 208, so as to convert the discovery signal or the data into a radio signal. The second wireless transmission unit 204 transmits the radio signal to other mobile stations performing the D2D communication.

The second wireless reception unit 205 receives the radio signal transmitted from another mobile station. The second wireless reception unit 205 performs a frequency conversion process, a demodulation process, or an encoding process on the received radio signal, so as to extract a discovery signal or data from the radio signal. The second wireless reception unit 205 outputs, for example, the extracted discovery signal or data to the control unit 207 or the storage unit 208.

The control unit 207 receives a control signal from the first wireless reception unit 202, extracts scheduling information or the like from the control signal, and outputs the scheduling information or the like to the first wireless transmission unit 201 or the first wireless reception unit 202. The first wireless transmission unit 201 and the first wireless reception unit 202 transmits a radio signal to the base station 100 or visitor a radio signal transmitted from the base station 100 according to the scheduling information included in the control signal.

The control unit 207 receives parameter information from the first wireless reception unit 202, and outputs the received parameter information to the second wireless transmission unit 204 or the second wireless reception unit 205. The second wireless transmission unit 204 and the second wireless reception unit 205 performs the D2D communication with another mobile station based on the parameter information.

The control unit 207 controls a probability of using a radio resource for a discovery signal. Specifically, the control unit 207 controls allocation of a radio resource for a discovery signal according to a QoS level. Details thereof will be described later.

The control unit 207 may acquire a random number p1 within a predetermined numerical value range, may determine that a radio signal for a discovery signal in a resource pool is used in a case where the acquired random number p1 is equal to or less than a threshold value, and may determine that the resource pool is unable to be used in a case where the random number p1 is more than the threshold value. In this case, the control unit 207 notifies the second wireless transmission unit 204 or the second wireless reception unit 205 of the determination, and the second wireless transmission unit 204 and the second wireless reception unit 205 transmit discovery signals according to the determination.

The storage unit 208 stores, for example, information regarding data or a control signal or information regarding a resource pool. For example, the first and second wireless reception units 202 and 205 or the control unit 207 may store data or a control signal in the storage unit 208 as appropriate, and the first and second wireless transmission units 201 and 204 or the control unit 207 may read information regarding the data or the control signal stored in the storage unit 208 as appropriate.

Operation Example

Next, a description will be made of an operation example. A description will be made of an operation example with reference to FIGS. 5A to 11.

In the D2D communication, a radio resource used to transmit or receive a discovery signal is selected from a resource pool. In this case, the mobile station 200 acquires the random number p1, can use the resource pool when the random number p1 is equal to or less than a threshold value Tx, and is unable to use the resource pool when the random number p1 is more than the threshold value Tx. In this case, as described above in the example illustrated in FIG. 14, the random number p1 appears as a value from "0" to "Tx", and a probability of being capable of using a resource pool is uniform as 1/Tx.

Figure 5A:
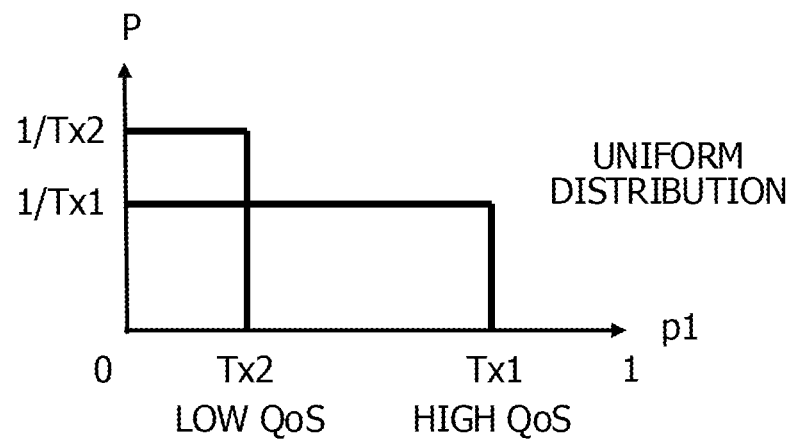
FIGS. 5A and 5B illustrate examples of probability distributions.

In contrast, in the second embodiment, there are the following two operation examples. The first operation example is an example in which a value of the threshold value Tx is adjusted according to a QoS level. FIG. 5A illustrates an example of a probability distribution. In FIG. 5A, a transverse axis expresses the random number p1, and the longitudinal axis expresses the probability P. As illustrated in FIG. 5A, a threshold value is set to Tx1 in a case where a QoS level is "high QoS", and a threshold value is set to Tx2 (<Tx1) in a case where a QoS level is "low QoS". In this case, with respect to the threshold value Tx in FIG. 14, the threshold value Tx1 may be Tx1>Tx, and the threshold value Tx2 may be Tx2<Tx. As mentioned above, in the second embodiment, the threshold value Tx is set to be different threshold values Tx1 and Tx2 according to a QoS level.

Figure 14:
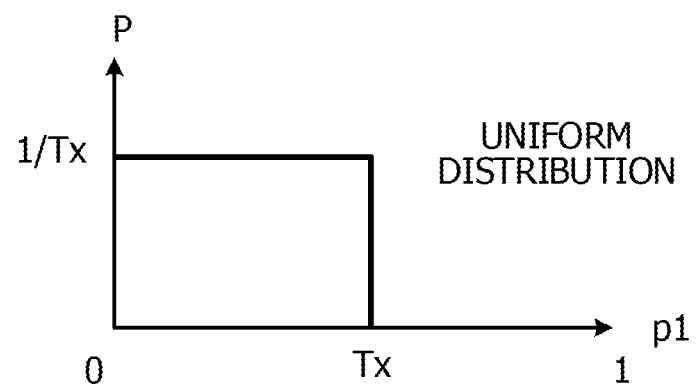
FIG. 14 illustrates an example of a probability distribution.

For example, in FIG. 5A, when an area of a quadrangle formed by the threshold value Tx1 and the probability P=1/Tx1 thereof is compared with an area of a quadrangle formed by the threshold value Tx and the probability P=1/Tx in FIG. 14, the former is larger than the latter. Therefore, a probability that the acquired random number p1 is equal to or less than the threshold value Tx1 is higher than in a case of the uniform distribution. Therefore, in a case where a QoS level is "high QoS", a probability of being capable of using a resource pool is higher than in a case of the uniform distribution, and, thus, in the mobile station 200, a probability of transmitting a discovery signal by using the resource pool can also be made higher than in a case of the uniform distribution.

On the other hand, for example, in FIG. 5A, when an area of a quadrangle formed by the threshold value Tx2 and the probability P=1/Tx2 thereof is compared with an area of a quadrangle formed by the threshold value Tx and the probability P=1/Tx in FIG. 14, the former is smaller than the latter. Therefore, a probability that the acquired random number p1 is equal to or less than the threshold value Tx2 is lower than in a case of the uniform distribution (for example, FIG. 14). Therefore, in a case where a QoS level is "low QoS", a probability of being capable of using a resource pool in the mobile station 200 is lower than in a case of the uniform distribution, and, thus, a resource pool may not be used, and thus a discovery signal may not be transmitted.

As mentioned above, since a probability of using a discovery signal is controlled, it is possible to avoid a situation in which a discovery signal may not be transmitted in a case where a QoS level is high and a situation in which a discovery signal is repeatedly transmitted many times in a case where a QoS level is low. Therefore, in the wireless communication system 10, it is possible to improve service quality for a discovery signal, and further service quality for D2D communication. Details of the first operation example will be described later.

Figure 5B:
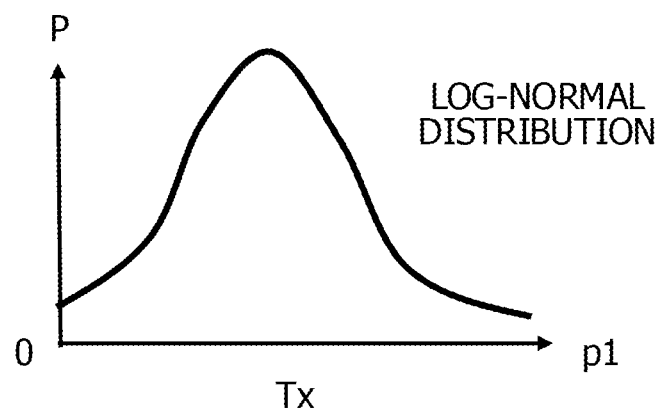

The second operation example is an example in which the probability P that the threshold value Tx may appear as the random number p1 is determined by a function which does not depend on a uniform distribution. FIG. 5B illustrates an example of a log-normal distribution as an example of such a function. In FIG. 5B, a transverse axis expresses the random number p1, and a longitudinal axis expresses the probability P. For example, the probability P that "0.5" may appear as the random number p1 is highest, and the probability that the random number p1 may appear becomes gradually lower as a distance from "0.5" increases. For example, in a case where a value acquired as the random number p1 is "0.5" (a value appearing most) at the threshold value Tx of "0.6", the value is equal to or smaller than the threshold value Tx, and, thus, the mobile station 200 can use a resource pool. On the other hand, in a case where a value acquired as the random number p1 is "0.7", the value is greater than the threshold value Tx, and thus the mobile station 200 is unable to use a resource pool.

In this case, a range of the random number p1 is set according to a QoS level of a discovery signal. For example, when a QoS level is "high QoS", a range of the random number p1 is set to [0,Tx] (a range in which the minimum value is "0", and the maximum value is "Tx"), and when a QoS level is "low QoS", a range of the random number p1 is set to [0,1] (a range in which the minimum value is "0", and the maximum value is "1"). The random number p1 acquired in the range of [0,Tx] of the random number p1 is equal to or less than the threshold value Tx, and, in a case of "high QoS", the mobile station 200 can use a resource pool. On the other hand, the random number p1 acquired in the range of [0,1] of the random number p1 may be more than the threshold value Tx, and, in a case of "low QoS", the mobile station 200 may be unable to use a resource pool.

Also in the second operation example, since a probability of using a discovery signal is controlled, it is possible to avoid a situation in which a discovery signal may not be transmitted in a case where a QoS level is high and a situation in which a discovery signal is repeatedly transmitted many times in a case where a QoS level is low. Therefore, in the wireless communication system 10, it is possible to improve service quality for a discovery signal, and further service quality for D2D communication.

Next, details of the first operation example and the second operation example will be described in this order.

(1) Operation Example in Case where a Value of Threshold Value Tx is Adjusted According to QoS Level As this operation example, there are an example in which the base station 100 sets the threshold values Tx1 and Tx2, and an example in which the mobile station 200 sets the threshold values Tx1 and Tx2. Hereinafter, the examples will be described in order.

(1-1) Example in which Base Station 100 Sets Threshold Values Tx1 and Tx2

Figure 6:
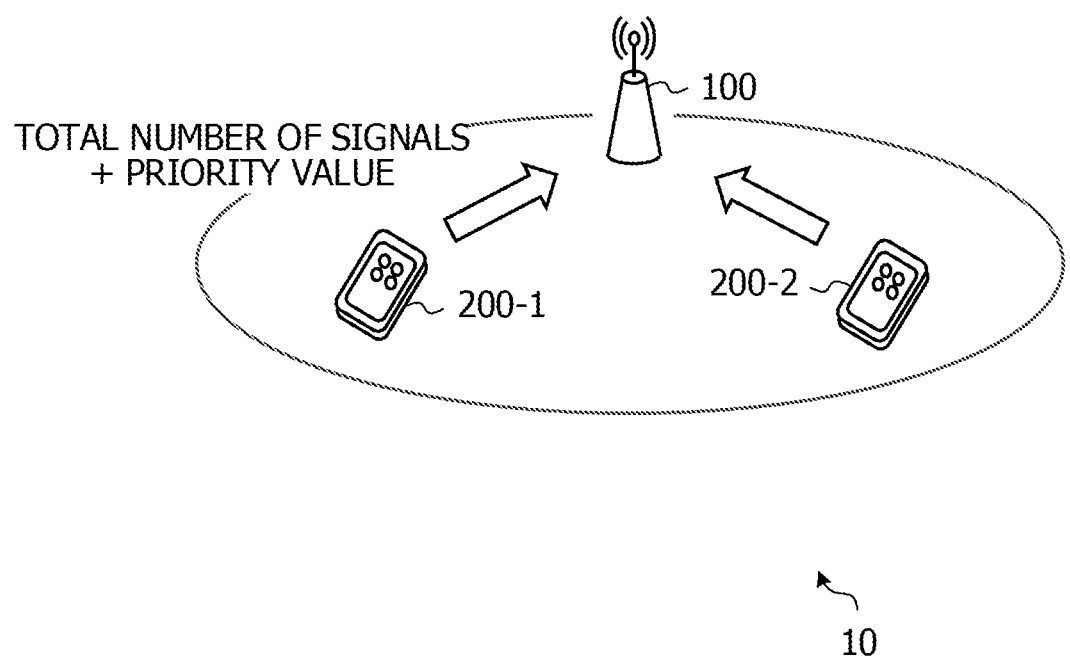
FIG. 6 illustrates an example in which the mobile station apparatus transmits a priority value.
Figure 7:
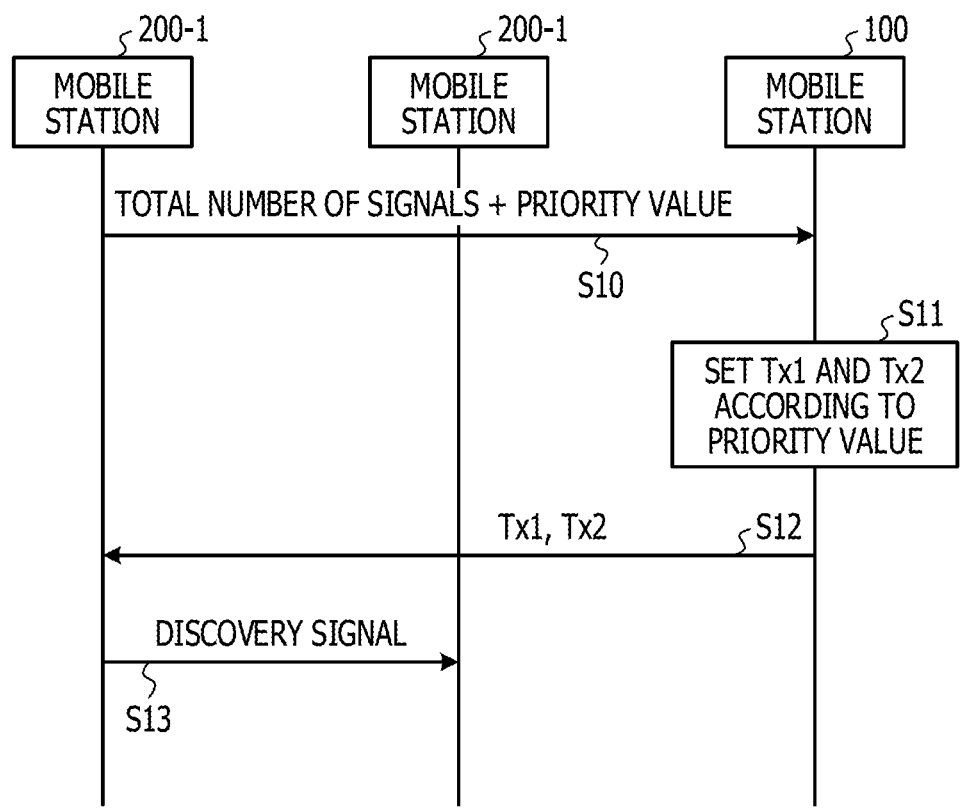
FIG. 7 is a sequence diagram illustrating an operation example.

FIG. 6 illustrates a configuration example of the wireless communication system 10 in this operation example, and FIG. 7 is a sequence diagram illustrating this operation example. In the current specification, the mobile station 200 (the mobile station 200-1 in the example illustrated in FIG. 6) notifies the base station 100 of a total number of discovery signals. In the second embodiment, the mobile station 200-1 transmits a QoS level in addition to a total number of discovery signals (S10 in FIG. 7). The mobile station 200-1 may transmit a priority value to the base station 100 as an index indicating the QoS level. For example, in a case where the QoS level is "high QoS", the priority value is "High", and, in a case where the QoS level is "low QoS", the priority value is "Low". As the priority value, a numerical value such as "0" or "1" may be used instead of "High" or "Low".

For example, the mobile station 200-1 performs the following process. In other words, the second wireless reception unit 205 measures QoS based on a radio resource transmitted from another mobile station (for example, the mobile station 200-2) performing the D2D communication or data included in the radio resource, and outputs a result thereof to the control unit 207. The radio resource transmitted from another mobile station also includes a discovery signal. As an index of the QoS, for example, there are a throughput (or a data amount or a packet amount per unit time), a packet loss, delay time, radio resource reception power, a signal to interference and noise ratio (SINR), and a carrier to interference and noise ratio (CINR). The QoS may be performed by the control unit 207 instead of the second wireless reception unit 205. The control unit 207 determines a priority value corresponding to a QoS level based on a table or the like stored in the storage unit 208, and outputs the priority value to the first wireless transmission unit 201 along with a total number of discovery signals. Consequently, the priority value is transmitted from the first wireless transmission unit 201 to the base station 100.

In a case where a total number of discovery signals and the priority value are received, the base station 100 sets the threshold values Tx1 and Tx2 according to the received priority value (S11). For example, in a case where the priority value transmitted from the mobile station 200-1 is received, the wireless reception unit 102 outputs the priority value to the control unit 104, and the control unit 104 sets the threshold values Tx1 and Tx2 according to the priority value. As described above, the control unit 104 sets the threshold value Tx1 for a numerical value of which the priority value indicates "high QoS", and sets the threshold value Tx2 for a numerical value of which the priority value indicates "low QoS".

The base station 100 transmits the set threshold values Tx1 and Tx2 to the mobile station 200-1 (S12). In this case, the base station 100 may perform broadcast transmission (or a notification) of SIB19 including the threshold values Tx1 and Tx2, and may separately transmit the threshold values Tx1 and Tx2 to the mobile station 200-1. For example, in a case where two threshold values Tx1 and Tx2 are set, the control unit 104 outputs the threshold values Tx1 and Tx2 to the wireless transmission unit 101. The threshold values Tx1 and Tx2 are transmitted from the wireless transmission unit 101 to the base station 100. For example, the threshold values Tx1 and Tx2 are information regarding probabilities thereof in a case where the base station 100 controls the probabilities that the mobile station 200-1 may use a resource pool for a discovery signal.

The mobile station 200-1 selects a radio resource from a resource pool based on the threshold values Tx1 and Tx2, and transmits a discovery signal by using the selected radio resource (S13). For example, in a case where the threshold values Tx1 and Tx2 are received via the first wireless reception unit 202, the control unit 207 selects a radio resource from the resource pool by using either of the threshold values Tx1 and Tx2 according to the QoS level. Since the information regarding the resource pool is received by the mobile station 200-1 by using, for example, SIB19, and is stored in the storage unit 208, the control unit 207 may read the information regarding the resource pool from the storage unit 208 as appropriate, and may acquire the random number p1 as described above so as to select a radio resource.

(1-2) Example in which Mobile Station 200 Sets Threshold Values Tx1 and Tx2

Figure 8:
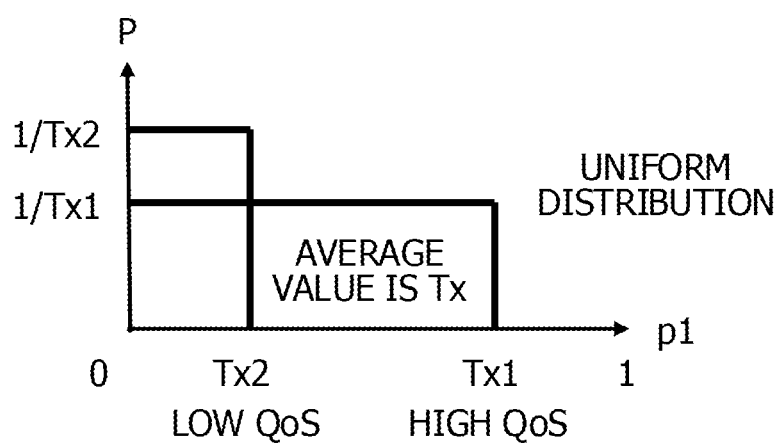
FIG. 8 illustrates an example of a probability distribution.
Figure 9:
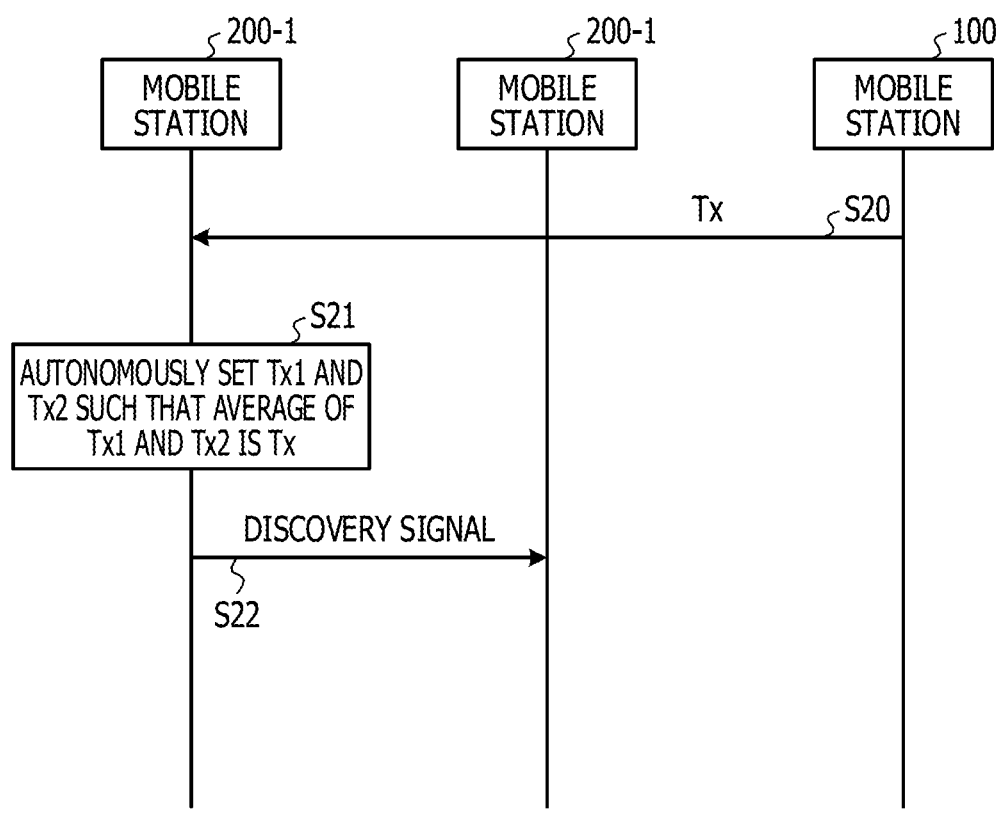
FIG. 9 is a sequence diagram illustrating an operation example.

FIG. 8 illustrates an example of setting the threshold values Tx1 and Tx2, and FIG. 9 illustrates a sequence example in this operation example. In this operation example, the mobile station 200 receives the threshold value Tx (for example, the threshold value Tx in FIG. 14) transmitted from the base station 100, and autonomously sets two threshold values Tx1 and Tx2 based on the threshold value Tx. In this case, the mobile station 200 may set the threshold values Tx1 and Tx2 such that an average of the threshold values Tx1 and Tx2 is the threshold value Tx. This is so that, for example, the mobile station 200 handles a probability of using a resource pool not differently from a system of the related art but as equally thereto as possible.

As illustrated in FIG. 9, the base station 100 transmits the threshold value Tx (S20). In this case, the base station 100 may transmit the threshold value Tx by using SIB19, and may separately transmit the threshold value Tx to the mobile station 200-1. For example, the control unit 104 reads the threshold value Tx from the storage unit 105 and outputs the threshold value Tx to the wireless transmission unit 101, and the threshold value Tx is transmitted from the wireless transmission unit 101 to the mobile station 200-1.

Next, the mobile station 200-1 autonomously sets the threshold values Tx1 and Tx2 such that an average of the two threshold values Tx1 and Tx2 is the threshold value Tx (S21). For example, the control unit 207 receives the threshold value Tx from the first wireless reception unit 202, and sets the threshold values Tx1 and Tx2 such that a value (or an average) obtained by dividing a result of adding the threshold values Tx1 and Tx2 together by "2" is the threshold value Tx.

In the same manner as in S13, the mobile station 200-1 selects a radio resource from the resource pool based on the threshold values Tx1 and Tx2 according to the QoS level, and transmits a discovery signal by using the selected radio resource (S22).

Figure 10A:
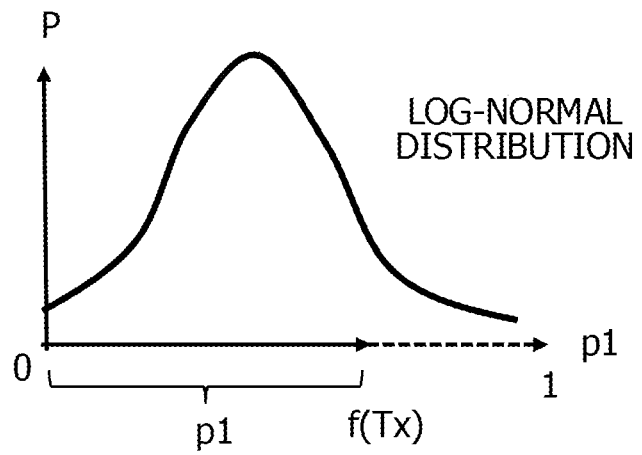
FIGS. 10A and 10B illustrate examples of probability distributions.
Figure 10B:
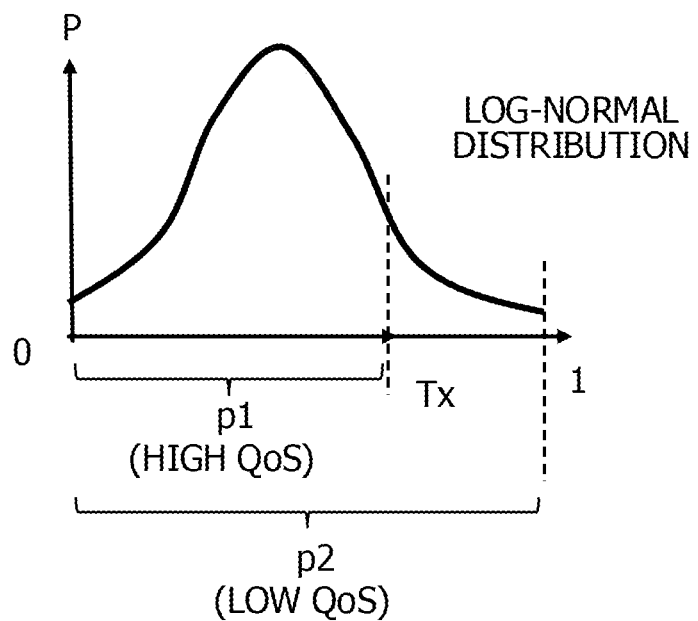

(2) Operation Example in Case where Probability P that Threshold Value Tx May Appear is Determined by Function which does not Depend on Uniform Distribution FIGS. 10A and 10B illustrate examples of distributions in this operation example. FIGS. 10A and 10B illustrate examples of log-normal distributions, but any function or distribution may be used, for example, except for a uniform distribution. For example, an n-th order function (where n is an integer of 1 or greater) such as a linear function or a quadratic function, a triangular distribution, a binomial distribution, a Poisson distribution, and a geometric distribution may be used.

FIG. 10B illustrates an example in which a range of the random number p1 is set according to a QoS level of a discovery signal. In FIG. 10B, f(Tx)=Tx (a range of the random number p1 is [0,Tx]) if a QoS level is "high QoS", and f(Tx)=1 (a range of the random number p1 is [0,1]) if a QoS level is "low QoS". Adjustment of the random number p1 may be performed by the mobile station 200-1.

Figure 11:
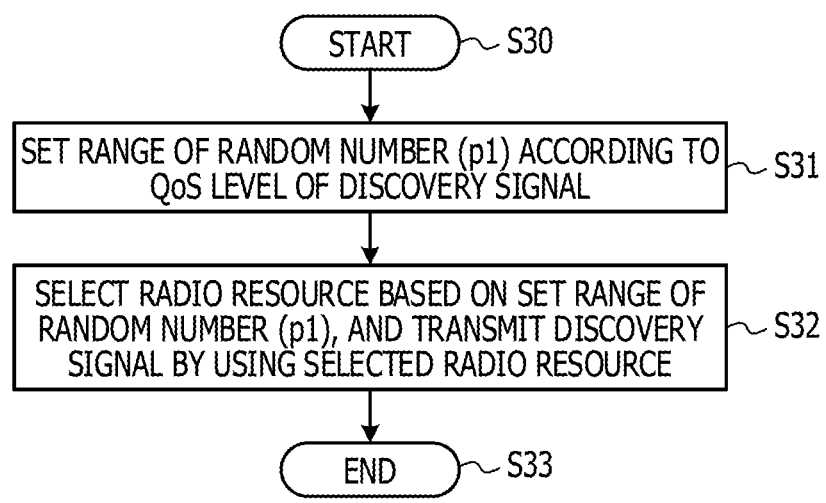
FIG. 11 is a flowchart illustrating an operation example.

FIG. 11 is a flowchart illustrating an operation example in the mobile station 200-1. In a case where a process is started (S30), the mobile station 200-1 sets a range of the random number p1 according to a QoS level of a discovery signal (S31). For example, in the same manner as in S10, the control unit 207 may measure a QoS level based on, for example, a discovery signal received from the mobile station 200-2. The control unit 207 sets a range of the random number p1 according to the QoS level as described above.

The mobile station 200-1 selects a radio resource from a resource pool based on the set range of the random number p1, and transmits a discovery signal by using the selected radio resource (S32), and finishes a series of processes (S33).

Other Embodiments

Figure 12:
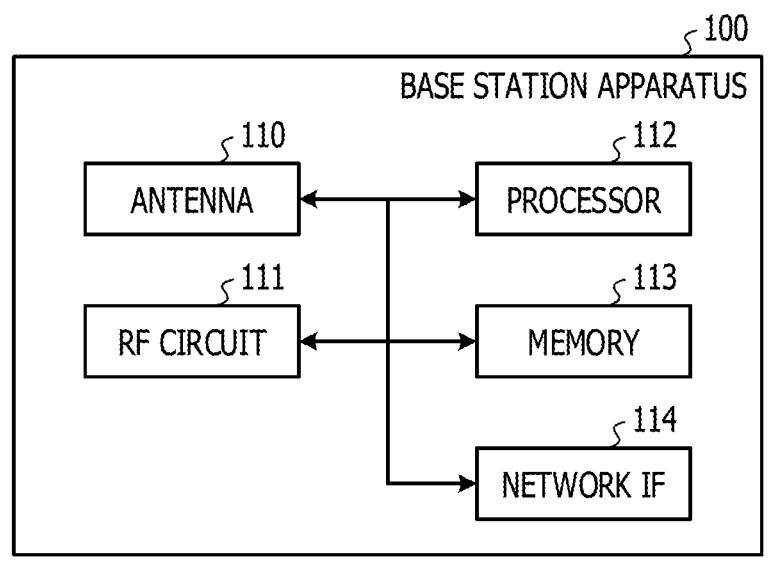
FIG. 12 illustrates a hardware configuration example of the base station apparatus.

FIG. 12 illustrates a hardware configuration example of the base station 100. The base station 100 includes an antenna 110, a radio frequency (RF) circuit 111, a processor 112, a memory 113, and a network interface (IF) 114. The processor 112 reads a program stored in the memory 113, and realizes a function of the control unit 104 by executing the program. The processor 112 corresponds to, for example, the control unit 104 in the second embodiment. The antenna 110 and the RF circuit 111 correspond to, for example, the wireless transmission unit 101 and the wireless reception unit 102 in the second embodiment. For example, the memory 113 corresponds to the storage unit 105 in the second embodiment, and the network IF 114 corresponds to the network communication unit 106 in the second embodiment.

Figure 13:
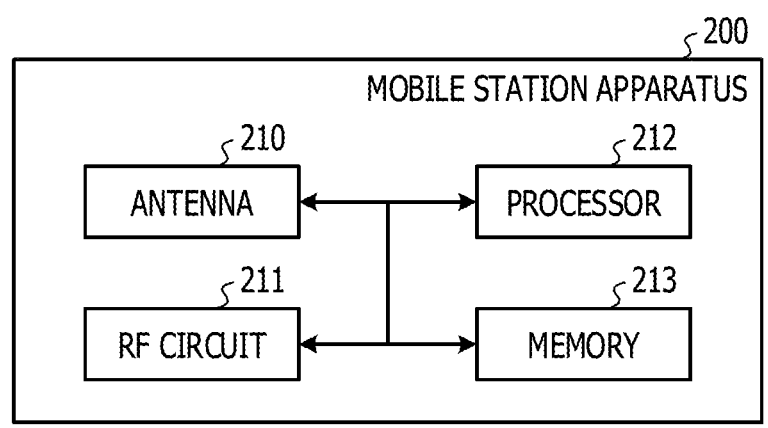
FIG. 13 illustrates a hardware configuration example of the mobile station apparatus.

FIG. 13 illustrates a hardware configuration example of the mobile station 200. The mobile station 200 includes an antenna 210, an RF circuit 211, a processor 212, and a memory 213. The processor 212 reads a program stored in the memory 213, and realizes a function of the control unit 207 by executing the program. The processor 212 corresponds to, for example, the control unit 207 in the second embodiment. The antenna 210 and the RF circuit 211 correspond to, for example, the first and second wireless transmission units 201 and 204, and the first and second wireless reception units 202 and 205 in the second embodiment. For example, the memory 213 corresponds to the storage unit 208 in the second embodiment.

The processor 112 and 212 may be, for example, a central processing unit (CPU), a micro processing unit (MPU), or a field programmable gate array (FPGA).

In the second embodiment, in the example of setting different threshold values Tx1 and Tx2 according to a QoS level, a description has been made of an example of setting two threshold values Tx1 and Tx2. For example, in a case where there are three QoS levels, the base station 100 or the mobile station 200 may set three threshold values Tx1 to Tx3 the QoS levels. For example, the base station 100 or the mobile station 200 may set four or more threshold values Tx1, Tx2, . . . , and Txn (where n is an integer of 4 or greater) according to a QoS level. In this case, Tx1<Tx2< . . . <Txn may be set in a descending order of a QoS level. The number of QoS levels and the number of threshold values Tx may or not be the same as each other. For example, even in a case where the number of QoS levels is three (for example, a high level, a low level, and a normal level), the number of threshold values Tx may be two (for example, Tx1 and Tx2). In this case, the mobile station 200 may set a plurality of threshold values Tx1, Tx2, . . . , and Txn based on the threshold value Tx received from the base station 100 such that an average thereof is the threshold value Tx.

In the second embodiment, a description has been made of an example in which the mobile station 200 adjusts a range of the random number p1 according to a QoS level. For example, the adjustment may be performed by the base station 100. In this case, the base station 100 may transmit a range of the random number p1 to the mobile station 200, and the mobile station 200 may select a radio resource from a resource pool by using the range of the random number p1.

In the second embodiment, a description has been made of an example in which a range of the random number p1 is [0,1]. For example, a range of the random number p1 may be [0,N] (where N is a number of 1 or greater) such as [0,10] or [0,100]. The minimum value of the random number p1 may be a numerical value such as "1" other than "0".

In the second embodiment, a description has been made of an example in which a range of the random number p1 is set to differ according to a QoS level. In this case, for example, a range of the random number p1 is set to [0,Tx] in the maximum QoS level, and a range of the random number p1 is made gradually more spread and closer to [0,1] as a QoS level becomes lower. A range of the random number p1 in the minimum QoS level may be set to [0,1].

In the second embodiment, a description has been made of an example in which the mobile station 200 performs wireless communication with the base station 100 with the first wireless communication unit 203, and performs D2D communication with another mobile station with the second wireless communication unit 206. The wireless communication with the base station 100 and the D2D communication with another mobile station may be performed by using, for example, a single wireless communication unit (the first or second wireless communication unit 203 or 206).

Combination of Embodiments

The above-described respective embodiments may be combined with each other in any form. For example, the following combination may be used.

In other words, the first embodiment and the second embodiment may be combined. In this case, the first and second wireless communication apparatuses 200-1 and 200-2 described in the first embodiment may be implemented as the mobile station apparatus 200 described in the second embodiment. The third wireless communication apparatus 100 described in the first embodiment may be implemented as the base station apparatus 100 described in the second embodiment. Therefore, the control unit 207 in the first embodiment corresponds to the control unit 207 in the second embodiment, the function of the control unit 207 described in the first embodiment may be realized by the control unit 207 described in the second embodiment, and the function of the control unit 207 described in the second embodiment may also be implemented by the control unit 207 described in the first embodiment.

The second embodiment and other embodiments may also be combined with each other. In this case, the base station apparatus 100 and the mobile station apparatus 200 described in the second embodiment may be implemented by the base station apparatus 100 and the mobile station apparatus 200 described in the other embodiments. In this case, the control unit 104 of the base station apparatus 100 in the second embodiment corresponds to the processor 112 in the other embodiments, and the processor 112 may realize the function of the control unit 104. The control unit 207 of the mobile station apparatus 200 in the second embodiment corresponds to, for example, the processor 212 in the other embodiments, and the processor 212 may realize the function of the control unit 207.

The first embodiment and other embodiments may also be combined with each other. In this case, the first and second wireless communication apparatuses 200-1 and 200-2 described in the first embodiment may be implemented by the mobile station apparatus 200 described in the other embodiments, and the third wireless communication apparatus 100 described in the first embodiment corresponds to the base station apparatus 100 described in the other embodiments. Therefore, the control unit 207 in the first embodiment corresponds to the processor 212 in the other embodiments, and the processor 212 may realize the function of the control unit 207. The function of the control unit 104 in the first embodiment may be realized by the processor 212 in the other embodiments.

All examples and conditional language recited herein of the RFID tag and the high frequency circuit are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication apparatus for performing wireless communication with a first wireless communication apparatus based on a discovery signal, the wireless communication apparatus comprising:
    a control circuit configured to control a probability of the discovery signal, the probability of the discovery signal being a probability of mapping the discovery signal to a radio resource within a resource pool that is usable for transmitting the discovery signal; and
    a communication circuit configured to transmit the discovery signal through the radio resource in accordance with the probability,
    wherein the controlling of the probability by the control circuit is configured to autonomously determine the probability of the discovery signal in accordance with a quality of service (QoS) and to cause the communication circuit to transmit the discovery signal by mapping the discovery signal to the radio resource within the resource pool in accordance with the probability determined by the control circuit of the wireless communication apparatus, the QoS in the controlling of the probability being required communication service quality between the wireless communication apparatus and the first wireless communication apparatus.

2. The wireless communication apparatus according to claim 1,
    wherein the QoS in the controlling of the probability is a quality of service (QoS) level or a priority of the discovery signal.

3. The wireless communication apparatus according to claim 1,
    wherein the controlling of the probability by the control circuit is configured to control the probability in accordance with a QoS level of the discovery signal.

4. The wireless communication apparatus according to claim 3,
    wherein the control circuit is configured to set a first and a second threshold in accordance with the QoS level of the discovery signal.

5. The wireless communication apparatus according to claim 3,
    wherein the control circuit is configured to set a first threshold in a case where the QoS level is a first level, and set a second threshold smaller than the first threshold in a case where the QoS level is a second level lower than the first level.

6. The wireless communication apparatus according to claim 5,
    wherein the control circuit is configured to
    determine that the radio resource for the discovery signal is used when an acquired random number is equal to or less than the first threshold in a case where the QoS level is the first level, and
    determine that the radio resource for the discovery signal is used if the acquired random number is equal to or less than the second threshold in a case where the QoS level is the second level, and
    wherein the communication circuit is configured to transmit the discovery signal according to the determination.

7. The wireless communication apparatus according to claim 4,
    wherein the communication circuit is configured to receive a third threshold transmitted from a second wireless communication apparatus, and
    wherein the control circuit is configured to set the first and second threshold such that an average of the first and second threshold is the third threshold.

8. The wireless communication apparatus according to claim 3,
    wherein the communication circuit is configured to
    transmit the QoS level of the discovery signal to a second wireless communication apparatus, and
    receive first and second threshold which are set according to the QoS level in the second wireless communication apparatus from the second wireless communication apparatus, and
    wherein the control circuit is configured to control the probability based on the first and second threshold.

9. The wireless communication apparatus according to claim 8,
    wherein the communication circuit is configured to transmit a priority value indicating the QoS level to the second wireless communication apparatus.

10. The wireless communication apparatus according to claim 8,
    wherein the communication circuit is configured to transmit a total number of the discovery signal and a priority value indicating the QoS level to the second wireless communication apparatus.

11. The wireless communication apparatus according to claim 1,
    wherein the control circuit is configured to
    acquire a random number, and
    set a probability of using a radio resource for the discovery signal to different probabilities according to the random number.

12. The wireless communication apparatus according to claim 11,
    wherein the control circuit is configured to determine that the radio resource for the discovery signal is used in a case where the acquired random number is equal to or less than a threshold, and
    wherein the communication circuit is configured to transmit the discovery signal according to the determination.

13. The wireless communication apparatus according to claim 11,
    wherein the control circuit is configured to control a range of the random number which can be acquired according to a QoS level of the discovery signal.

14. The wireless communication apparatus according to claim 13,
wherein the control circuit is configured to
execute first processing when the QoS level is a first level, the first processing including setting a range of the random number to a range from the minimum value to a value which is equal to or smaller than a threshold, and
executing second processing when the QoS level is a second level lower than the first level, the second processing including setting a range of the random number to a range from the minimum value to the maximum value.

15. The wireless communication apparatus according to claim 1,
wherein the wireless communication apparatus is configured to transmit information regarding the QoS to a base station apparatus, and to receive, from the base station, one or more of parameters to be used in the autonomously setting of the probability,
wherein the first wireless communication apparatus is a mobile station apparatus.

16. A wireless communication apparatus performing wireless communication with a first wireless communication apparatus, the wireless communication apparatus comprising:
a control circuit configured to control a probability of a discovery signal, the probability of the discovery signal being a probability of mapping the discovery signal to a radio resource within a resource pool that is usable for transmitting a discovery signal; and
a communication circuit configured to enable information regarding the probability to be transmitted to the first wireless communication apparatus,
wherein the first wireless communication apparatus is configured to transmit the discovery signal to a second wireless communication apparatus by mapping the discovery signal to the radio resource according to the probability of the discovery signal autonomously determined by the first wireless communication apparatus in accordance with a quality of service (QoS), the QoS in the controlling of the probability being required communication service quality between the wireless communication apparatus and the first wireless communication apparatus, and
wherein the first and second wireless communication apparatuses are configured to perform wireless communication based on the discovery signal.

17. A wireless communication system comprising:
first and second wireless communication apparatuses configured to perform wireless communication based on a discovery signal; and
a third wireless communication apparatus configured to perform wireless communication with the first wireless communication apparatus,
wherein the first or third wireless communication apparatus is configured to control a probability of the discovery signal, the probability of the discovery signal being a probability of mapping the discovery signal to a radio resource within a resource pool that is usable for transmitting the discovery signal by autonomously determining the probability of the discovery signal in accordance with a quality of service (QoS), the QoS in the controlling of the probability being required communication service quality between the first wireless communication apparatus and the second wireless communication apparatus, and
wherein the first wireless communication apparatus is configured to enable the discovery signal to be transmitted to the second wireless communication apparatus by mapping the discovery signal to the radio resource according to the probability of the discovery signal.

18. A processing method performed by a wireless communication apparatus including a control circuit and a communication circuit, the wireless communication apparatus being configured to perform wireless communication with a first wireless communication apparatus based on a discovery signal, the method comprising:
causing the control circuit to control a probability of the discovery signal, the probability of the discovery signal being a probability of mapping the discovery signal to a radio resource within a resource pool that is usable for transmitting the discovery signal; and
causing the communication circuit to enable the discovery signal to be transmitted by mapping the discovery signal to the radio resource according to the probability of the discovery signal,
wherein the controlling of the probability by the control circuit is configured to autonomously determine the probability of the discovery signal in accordance with a quality of service (QoS) and to cause the communication circuit to transmit the discovery signal by mapping the discovery signal to the radio resource within the resource pool in accordance with the probability determined by the control circuit of the wireless communication apparatus, the QoS in the controlling of the probability being required communication service quality between the wireless communication apparatus and the first wireless communication apparatus.

* * * * *